United States Patent [19]

Gierse et al.

[11] Patent Number: 4,615,124

[45] Date of Patent: Oct. 7, 1986

[54] FLUFF FILTERING DEVICE OF A CONVECTION DRYING AND/OR SETTING MACHINE

[75] Inventors: Franz-Josef Gierse, Siegen; Heinrich Hermanns, Korschenbroich; Werner Hermes, Tönisvorst; Gerhard Lüpnitz, Monchen-Gladbach; Manfred Pabst, Cologne; Heribert Schlicht, Monchen-Gladbach, all of Fed. Rep. of Germany

[73] Assignee: A. Monforts GmbH & Co., Monchen-Gladbach, Fed. Rep. of Germany

[21] Appl. No.: 732,442

[22] Filed: May 9, 1985

[30] Foreign Application Priority Data

May 9, 1984 [DE] Fed. Rep. of Germany ....... 3417101

[51] Int. Cl.$^4$ ............................................. F26B 21/00
[52] U.S. Cl. .......................................... 34/82; 34/155; 55/481
[58] Field of Search ........................... 34/82, 155, 158; 55/267, 481, 486, 487

[56] References Cited

U.S. PATENT DOCUMENTS

| | | | |
|---|---|---|---|
| 1,862,659 | 6/1932 | Christofferson | 55/487 |
| 2,713,213 | 7/1955 | Bogarty | 34/82 |
| 4,198,221 | 4/1980 | Latlin et al. | 55/481 |
| 4,435,909 | 3/1984 | Williamson | 34/82 |
| 4,512,787 | 4/1985 | Mathews | 55/481 |
| 4,551,928 | 11/1985 | Gottschalk | 34/82 |

FOREIGN PATENT DOCUMENTS 1031266  6/1953  France .................................. 55/481

Primary Examiner—Albert J. Makay
Assistant Examiner—David W. Westphal
Attorney, Agent, or Firm—Herbert L. Lerner; Laurence A. Greenberg

[57] ABSTRACT

A fluff filtering device within a convection drying and/or setting machine for treating a textile material web includes a device for circulating an air stream through the textile material web, a device for heating the air stream, an active filter screen with a frame of a given thickness disposed substantially horizontally in an operating position upstream of the heating device in the air stream for preventing fluff and other deposites from reaching the heating device, the active filter screen being substantially horizontally removable from the machine for cleaning, the active filter screen being upwardly movable into another position by a distance at least equal to the given thickness, and another screen slideable under the active filter screen into the operating position when the active filter screen is in the other position.

4 Claims, 1 Drawing Figure

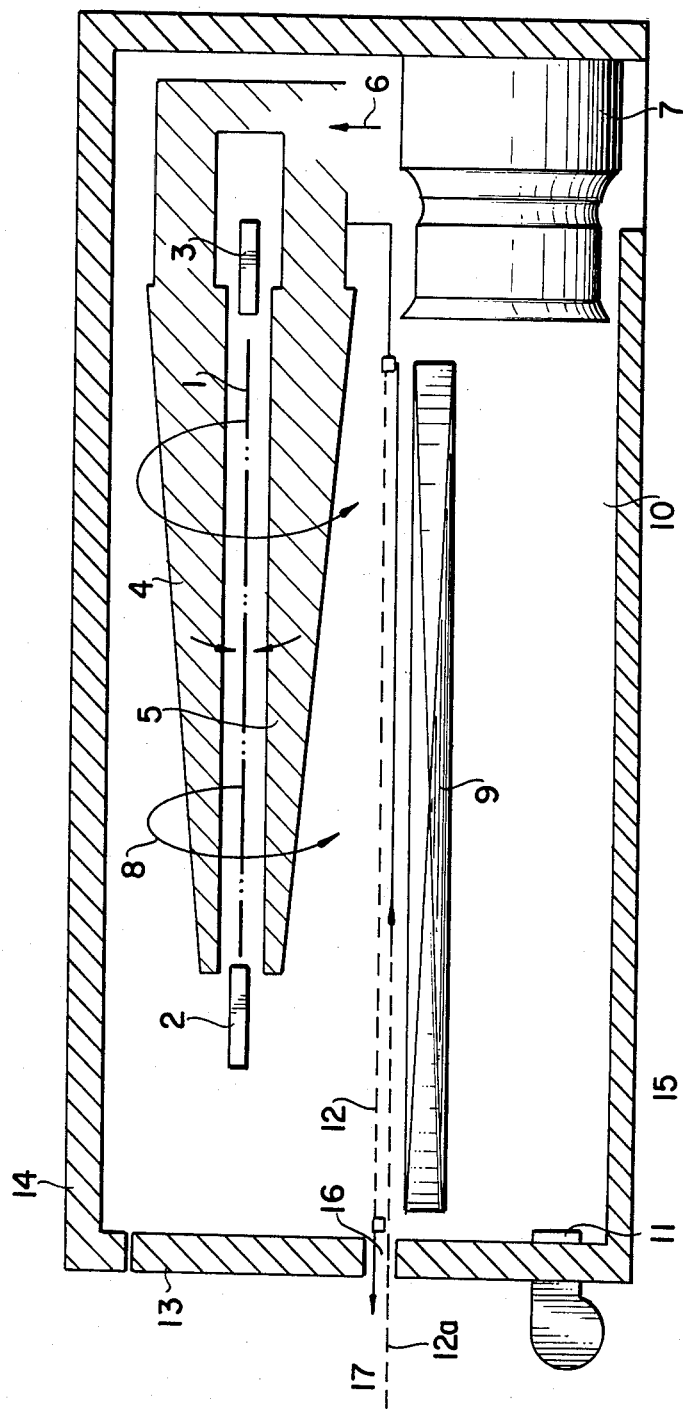

FLUFF FILTERING DEVICE OF A CONVECTION DRYING AND/OR SETTING MACHINE

The invention relates to a fluff filtering device disposed in the interior of a convection drying and/or setting machine for treating a textile material web with a heated circulating-air stream, including a filter screen which is disposed approximately horizontally in an operating position in the circulating air stream for preventing fluff and other deposits from penetrating into a heat exchanger or combustion chamber of the machine or the like, and which can be pulled out of the machine in the horizontal direction for cleaning. The convection machine is preferably a planar or loop drying or setting machine such as a tenter frame, a screen belt dryer, a hot flue or the like. The term "circulating air stream" includes any gaseous treatment medium employed in the machines of the type described above.

In convection machines provided for the continuous drying and/or setting of textile material webs with a gaseous treatment medium blown from nozzles, preferably on both sides of the web of material, the internal machine parts have become less and less accessible as the constructions have become increasingly more compact. This fact has a particularly detrimental effect on the cleaning of the interior of the machine which is required regularly. Filter screens are used in order to prevent fluff, threads or the like which enter into the treatment machine in more or less raw condition, from dropping down from the web of material entering the machine and penetrating into the machine units such as the combustion chamber or the heat exchanger, where they would lead to soiling or even to the danger of fire. The filter screens are placed in the circulating air stream and preferably into the return stream coming from the web of material upstream of the location at which the stream makes contact with the units downstream thereof.

While the filter screens serve their purpose by catching fluff or the like, they form a resistance for the circulating air stream which becomes higher in proportion to the quantity of fluff caught. In order to permit cleaning of the screens while the machine is running, the filter screens have already been disposed horizontally in the machine in such a manner that they can be pulled laterally out of the interior of the machine in the horizontal direction, cleaned outside the machine and/or replaced by other screens, through the use of slots provided in the wall of the machine. This is done without interruption of the production, for instance without having to open the doors of tenter frame. This cleaning or replacement must in any case be accomplished very quickly so as to minimize the penetration of the deposits in the meantime into the units of the machine to be protected.

It is accordingly an object of the invention to provide a fluff filtering device of a convection drying and/or setting machine, which overcomes the hereinafore-mentioned disadvantages of the heretofore-known devices of this general type and to do so in such a manner that dirt accumulation on the machine parts to be protected cannot occur, even while a filter screen which can be pulled horizontally out of the interior of the machine is being cleaned. With the foregoing and other objects in view there is provided, in accordance with the invention, a fluff filtering device within a convection drying and/or setting machine for treating a textile material web, comprising means for circulating an air stream through the textile material web, means for heating the air stream such as a heat exchanger or combustion chamber, an active filter screen with a frame of a given thickness disposed substantially horizontally in an operating position upstream of said heating means in the air stream for preventing fluff and other deposits from reaching the heating means, the active filter screen being substantially horizontally removable from the machine for cleaning, the active filter screen being upwardly movable into another position by a distance at least equal to the given thickness, and another preferably cleaned screen slideable under the active filter screen into the operating position when the active filter screen is in the other position.

In accordance with another feature of the invention, there are provided means for lifting the active filter screen during insertion of the other filter screen.

By replacing a filter screen with a second cleaned filter screen according to the invention, even during the exchange of a filter screen which can be inserted into or pulled out of the machine, reliable protection of units disposed downstream in the air stream to be filtered, is assured. Since the new, cleaned filter screen is always brought into the operating position of the screen prior to the final removal of the active filter screen, dirt dropping off the first screen when it is removed also cannot get into the machine space disposed downstream, since the operating position of the screen is always completely secured. If the second screen is gradually clogged up by intercepted fluff and the like after a certain operating time, it can be replaced again in the manner described above by a new screen, such as the first screen which has been cleaned in the meantime.

Other features which are considered as characteristic for the invention are set forth in the appended claims.

Although the invention is illustrated and described herein as embodied in a fluff filtering device of a convection drying and/or setting machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single figure of the drawing which is a diagrammatic, vertical-sectional view of a planar or tenter frame, transverse to the longitudinal direction of the frame.

Referring now to the figure of the drawing in detail it is seen that a web of material to be treated in a filtering device of a convection and/or setting machine is held at the lengthwise edges thereof in chains 2 and 3 and is guided in a direction perpendicular to the plane of the drawing between nozzle boxes 4 and 5 disposed above and below the web. The web of material is treated during the process from above and below with gas, preferably hot air, introduced by a fan 7 in the direction of an arrow 6. The gas flowing back from the web of material in the direction of an arrow 8 is again drawn in, at least for the most part, by the fan 7, and is blown again on the web of material 1 in a closed loop. If the treatment gas in the illustrated embodiment is to be hot, it is conducted through a heat exchanger 9 or through a combustion chamber 10, such as with a direct gas heater 11, along its path from the web of material 1 to the fan 7.

Since fluffs, threads and similar items can drop off the web of material 1 when it is sprayed with the treatment gas, a filter screen 12 with a frame is generally placed in the return stream flowing in the direction of the arrow 8. In order to permit cleaning of the filter screen 12 while in operation, i.e., without opening a door 13 in the casing 14 of the machine, the screen 12 is guided in tracks 15, it can be pulled out of the machine laterally in the horizontal direction 17 through a slot 16 in the casing 14 and it can be exchanged or cleaned.

In order to preclude dirtying of the machine units 9, 10 or 11 downstream of the screen operating position in the air stream 8, even during the replacement or cleaning of the filter screen 12, a new, clean filter screen 12a is placed in the operating position of the screen 12 before the particular filter screen 12 which is then active is pulled out. This is done by lifting the screen 12 substantially vertically out of the operating position during the insertion process by a distance at least equal to the thickness of the screen frame, and thereby making room for the new screen 12a. Subsequently, the soiled screen 12 can be pulled out of the machine without the danger of soiling the interior of the machine at any time. Even if deposits fall or are blown down from the filter screen 12 when the filter screen 12 is being pulled out of the machine, there is no danger of soiling the machine units disposed downstream, since such dirt particles will naturally be deposited on the new screen 12a which is already in the operating position when a soiled screen is being pulled out.

A device may also be provided for lifting the active filter screen during insertion of the new screen, such as rods which can be inserted through vertical slots in the casing 14 in order to support the screen frame and move it upward when the rods are raised.

We claim:

1. Fluff filtering device within a convection drying and/or setting machine for treating a textile material web, comprising means for circulating an air stream through the textile material web, means for heating said air stream, an active filter screen with a frame of a given thickness disposed substantially horizontally in an operating position upstream of said heating means in said air stream for preventing fluff and other deposits from reaching said heating means, said active filter screen being substantially horizontally removable from the machine for cleaning, said active filter screen being upwardly movable into another position by a distance at least equal to said given thickness during which movement said active filter screen is in effective operation, and another screen slideable under said active filter screen into said operating position when said active filter screen is in said other position so as to allow replacement of the active filter screen without interruption of the filtering operation.

2. Fluff filtering device according to claim 1, wherein said heating means are in the form of a heat exchanger.

3. Fluff filtering device according to claim 1, wherein said heating means are in the form of a combustion chamber.

4. Fluff filtering device according to claim 1, including means for lifting said active filter screen during insertion of said other filter screen.

* * * * *